United States Patent
Malone et al.

(10) Patent No.: US 6,755,568 B2
(45) Date of Patent: Jun. 29, 2004

(54) INFLATABLE INSULATING LINERS FOR SHIPPING CONTAINERS AND METHOD OF MANUFACTURE

(75) Inventors: Thomas G. Malone, San Diego, CA (US); David B. McKinney, San Diego, CA (US)

(73) Assignee: Cargo Technology, Inc., San Diego, CA (US)

( * ) Notice: Subject to any disclaimer, the term of this patent is extended or adjusted under 35 U.S.C. 154(b) by 0 days.

(21) Appl. No.: 09/683,392

(22) Filed: Dec. 20, 2001

(65) Prior Publication Data

US 2002/0081041 A1 Jun. 27, 2002

Related U.S. Application Data

(60) Provisional application No. 60/257,919, filed on Dec. 21, 2000.

(51) Int. Cl.[7] .............................................. B65D 33/00
(52) U.S. Cl. ............................ 383/3; 383/110; 206/522
(58) Field of Search ....................... 383/3, 110; 206/522

(56) References Cited

U.S. PATENT DOCUMENTS

| | | | | |
|---|---|---|---|---|
| 3,556,186 A | * | 1/1971 | Besthorne | 383/3 |
| 3,730,240 A | * | 5/1973 | Presnick | 383/3 |
| 3,904,465 A | * | 9/1975 | Haase et al. | 156/199 |
| 4,044,867 A | * | 8/1977 | Fisher | 190/107 |
| 4,091,482 A | * | 5/1978 | Malcolm | 5/413 R |
| 4,164,970 A | * | 8/1979 | Jordan | 383/3 |
| 4,262,045 A | | 4/1981 | Cheng et al. | |
| 4,284,674 A | | 8/1981 | Sheptak | |
| 4,574,953 A | * | 3/1986 | Garbuzov | 206/522 |
| 4,618,517 A | | 10/1986 | Simko, Jr. | |
| 4,636,416 A | | 1/1987 | Kratel et al. | |
| 4,669,632 A | | 6/1987 | Kawasaki et al. | |
| 4,801,213 A | * | 1/1989 | Frey et al. | 383/3 |
| 5,000,382 A | * | 3/1991 | Stedman | 236/46 R |
| 5,230,941 A | * | 7/1993 | Hollander et al. | 428/116 |
| 5,263,587 A | * | 11/1993 | Elkin et al. | 383/3 X |
| 5,270,092 A | | 12/1993 | Griffith et al. | |
| 5,314,250 A | * | 5/1994 | Lee | 383/3 |
| 5,427,830 A | * | 6/1995 | Pharo | 383/3 X |
| 5,535,888 A | | 7/1996 | De Luca | |
| 5,588,532 A | | 12/1996 | Pharo | |
| 5,706,969 A | | 1/1998 | Yamada et al. | |
| 6,176,613 B1 | * | 1/2001 | Chen | 383/3 |
| 6,283,296 B1 | * | 9/2001 | Newmn | 383/3 X |

FOREIGN PATENT DOCUMENTS

| | | | | |
|---|---|---|---|---|
| DE | 2339078 | * | 2/1975 | 383/3 |
| DE | 2549179 | * | 6/1977 | 383/3 |
| DE | 27 50 819 | | 5/1979 | |
| EP | 662 430 A1 | | 1/1995 | |
| FR | 2367671 | * | 5/1978 | 383/3 |

* cited by examiner

Primary Examiner—Jes F. Pascua
(74) Attorney, Agent, or Firm—John C. Lambertsen; Kenehan & Lambertsen, LTD

(57) ABSTRACT

An inflatable insulating panel consisting of a plurality of sheetform polyolefin layers, and its manner of fabrication, is provided. An outer peripheral seal forms an inflatable panel, with an intermediate interconnected web of layers formed out of an array of alternating seams of attachment between the outer and intermediate adjacent layers. Upon inflation of the panel, the interconnected web expands to form a plurality of individual baffle chambers.

7 Claims, 10 Drawing Sheets

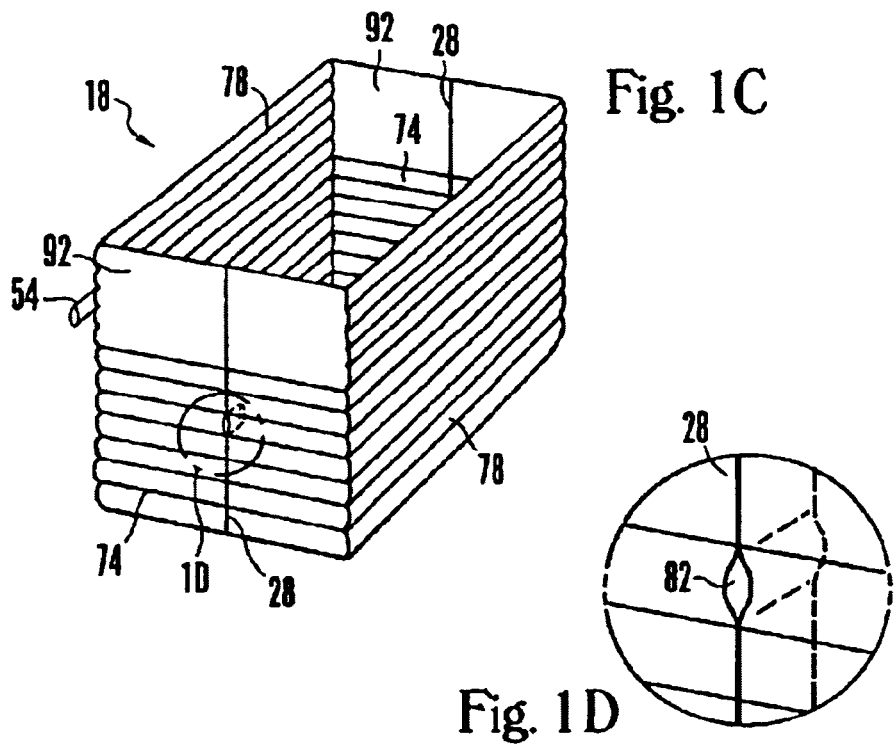
Fig. 1C
Fig. 1D
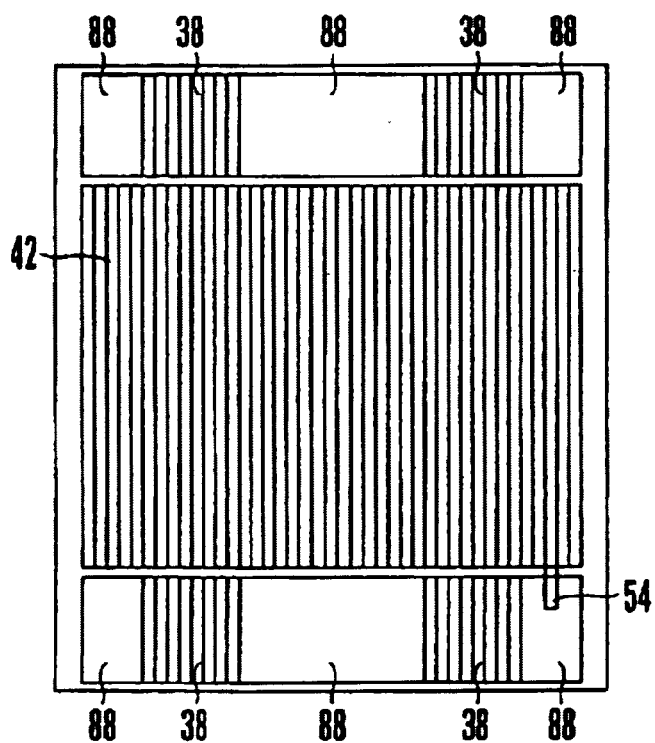
Fig. 2

Fig. 3
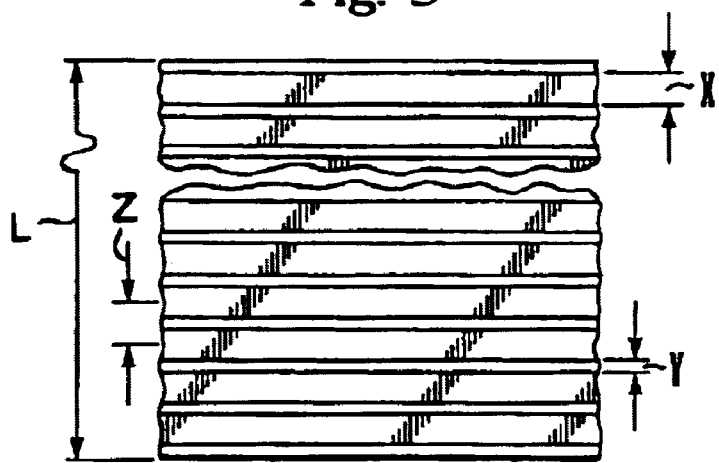
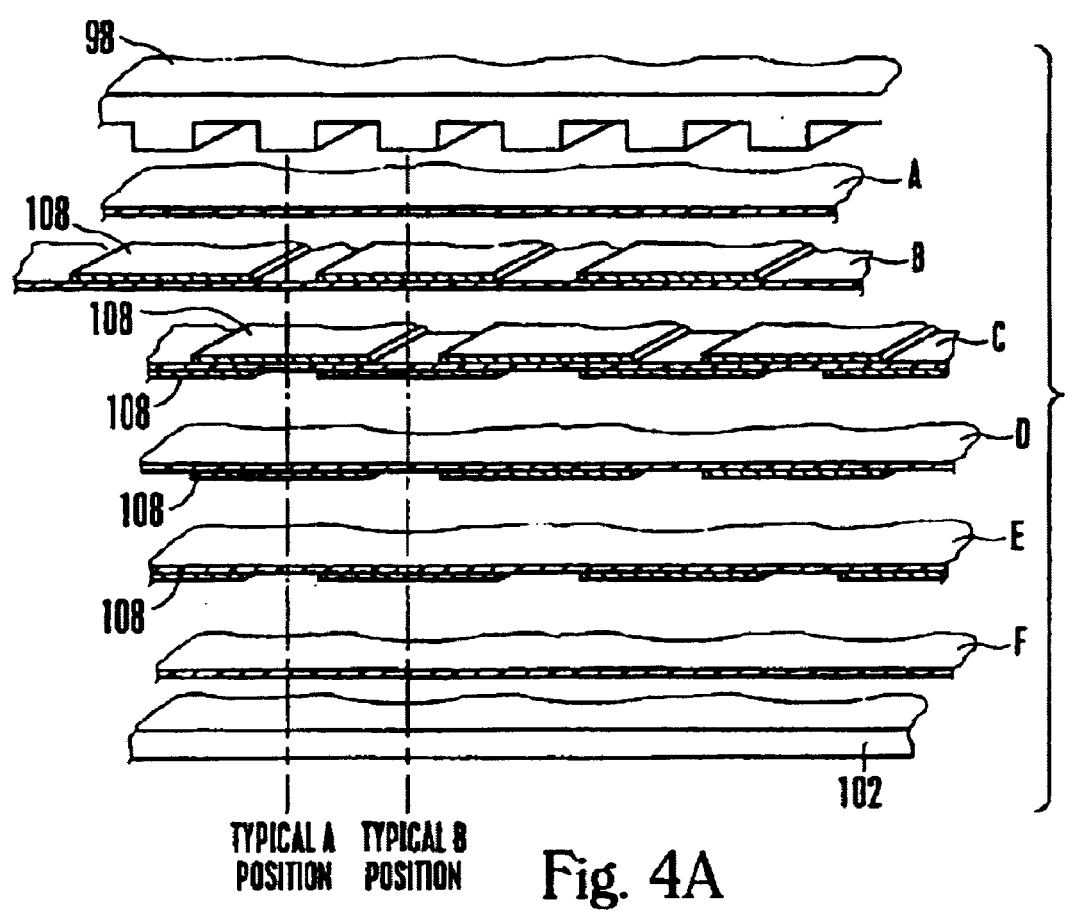
TYPICAL A  TYPICAL B
POSITION  POSITION
Fig. 4A

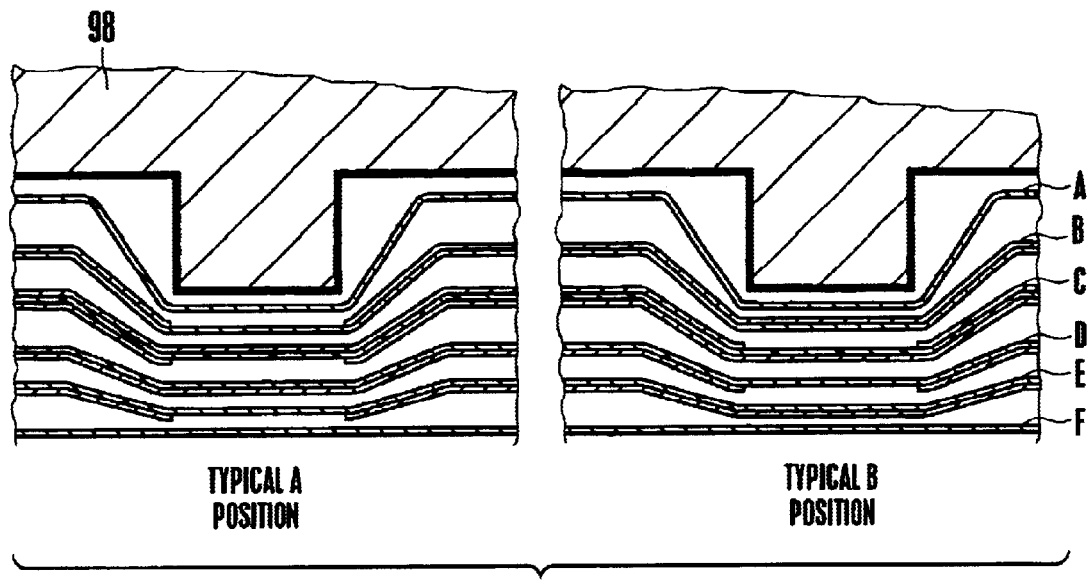
Fig. 4B
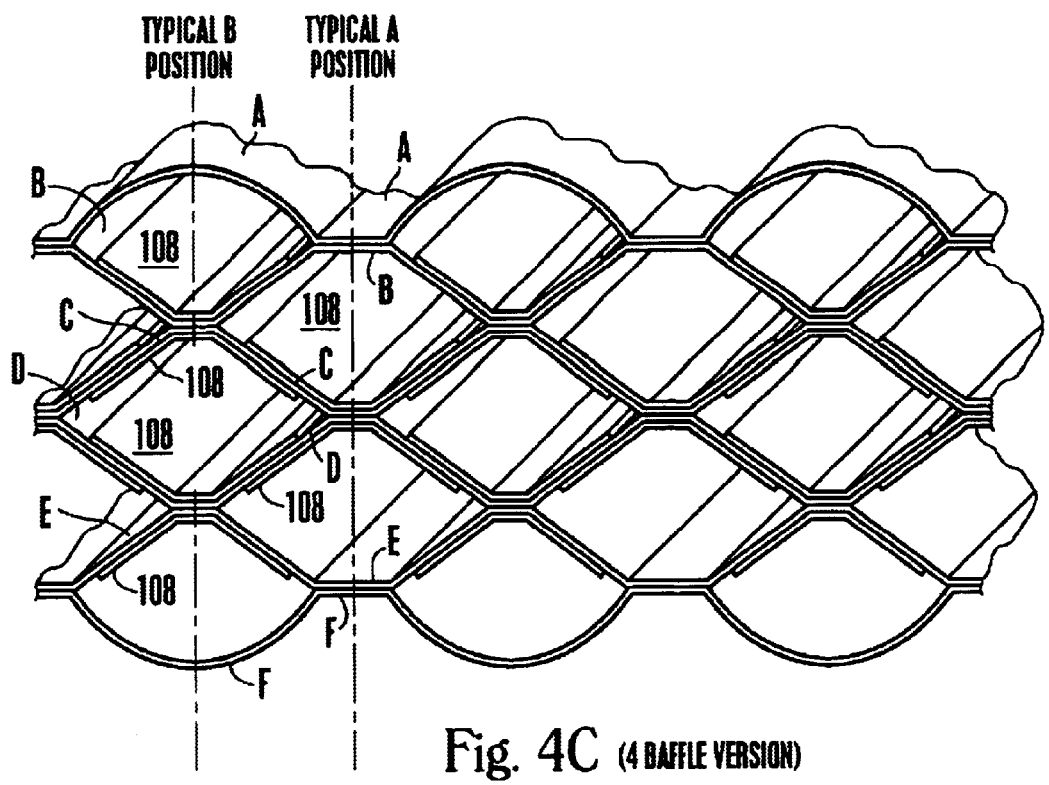
Fig. 4C (4 BAFFLE VERSION)

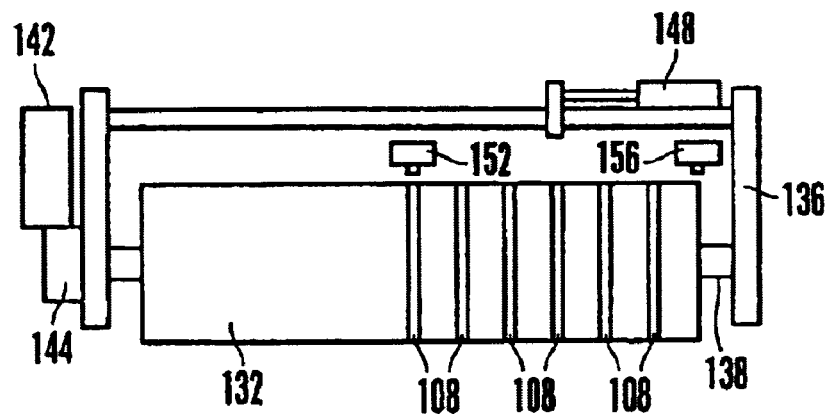
Fig. 6
Fig. 7
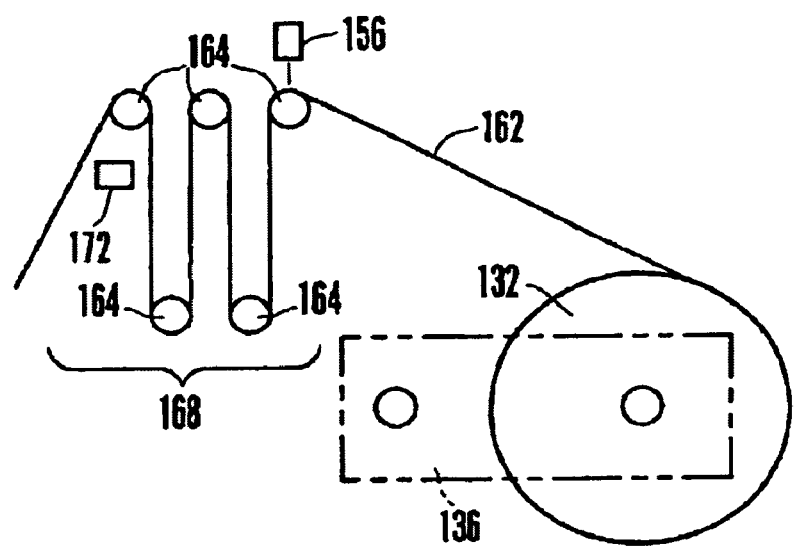

INFLATABLE INSULATING LINERS FOR SHIPPING CONTAINERS AND METHOD OF MANUFACTURE

CROSS REFERENCE TO RELATED APPLICATIONS

This application claims the benefit of U.S. Provisional Patent Application, Serial No. 60/257,919, filed Dec. 21, 2000.

BACKGROUND OF INVENTION

1. Field of the Invention

The present invention relates to thermally insulated shipping container liners, and, more particularly, to container liners that are inflatable. More specifically, the present invention relates to an envelope composed of multiple layers of a polymeric material that, upon inflation, form baffled layers configured as a shipping container liner.

2. Description of the Prior Art

In the transportation and distribution of products, both the product and the package define the "shipping environment". While the corrugated fiberboard boxes, steel drums, wooden crates, and pallets have not changed significantly over the past 80 years, the shipping requirements of the products have changed with each new generation of both product and shipping technology. As a result, packaging materials have improved to meet the demands of the new technology.

Refrigerated transportation at one time meant a horse-drawn wagon packed with ice and straw. Super-cooled gases and microprocessor-controlled motors have replaced the earlier, primitive refrigeration techniques. Reliable, temperature-controlled, surface transportation is now available to and from almost anywhere in the world. Trucks and ocean container shipping utilize positive, mechanical refrigeration systems to retard spoilage in transit.

Such surface transportation is relatively slow, and the shipped goods must have a correspondingly long shelf life. However, many temperature-sensitive products, such as perishable foodstuffs, are time-sensitive as well. Successful long-distance shipping is only feasible where transportation time can be minimized.

Servicing a worldwide food market required yet another technological development C the generous cargo holds of newer, wide-body passenger jet aircraft in the late 1960's and early 70's. The drop in airfreight rates heralded by these new jets for the first time permitted the cost-effective transportation of perishable, medium-value commodities such as meat, seafood, and fresh produce.

Traditionally, such perishable foodstuffs, as well as pharmaceuticals, are cooled prior to shipment, then placed within a thermal insulating material, and shipped with only a modicum of ice or refrigerant to absorb the heat that flows through the insulation. For many years, molded expanded polystyrene ("EPS") containers have been the thermal insulating material of choice. The perishable goods are placed within the EPS containers, which are then in turn placed within small, corrugated shipping boxes.

EPS containers have been widely used since the lowered airfreight rates first made this form of shipment economically practical. While providing satisfactory insulation qualities as well as being light in weight, EPS also presents several negative characteristics to the shipping industry. EPS is an "expanded," non-compressible material, and consists of a very large number of small air bubbles formed in a polystyrene plastic matrix. EPS's poor volume efficiency increases shipment costs when transporting the empty containers to the location of their use, as well as causing increased warehousing costs when stored in inventory prior to use.

While providing reasonable protection from shock impacts during transit, EPS has poor resistance to the application of puncture and shear loading. EPS easily fractures, requiring the use of an additional plastic liner bag when shipping products with a liquid component, such as ice-chilled, fresh seafood. The lack of such an additional plastic liner risks liquid leakage from the EPS container during shipment, and the resultant expensive damage to aircraft cargo holds or other corrosion-sensitive shipping environments.

In an effort to avoid EPS and its negative characteristics, a number of shippers have attempted to make use of metallized, radiant barrier bags. Relying on the property of shiny, metallized coatings to reflectively radiate heat energy, such products have found only marginal success as insulated packaging. Although reducing warehousing and breakage expenses, as well as enjoying lower manufacturing costs, many shippers have determined that such radiant bags do not control temperatures over a sufficiently long period of time.

Ideally, it would be desirable to provide an insulative system having a reliable thermal performance over extended time periods (at least 48 hours), which is leak proof, can be shipped and stored in a manner requiring less space than EPS, and that is fabricated out of materials and in a manner that remains cost-competitive with the EPS insulated box product.

Griffith, et al., in U.S. Pat. No. 5,270,092, suggests an inflatable insulating alternative. Fabrication of an outer envelope is suggested to be out of a multi-layer polymeric material, with multiple layers of baffles contained within the envelope. One or more of the baffle surfaces are covered by a low emissivity surface, to further suppress heat transfer in the form of infrared radiation.

Despite the promise of the Griffith, et al., baffled envelopes, that structure has resisted prior efforts for a commercially practical method of fabrication. Present commercial insulative materials, such as expanded polystyrene ("EPS"), have continued to maintain a manufacturing cost advantage. A need thus exists for an inflatable, baffled envelope structure that can be inexpensively manufactured, yet provide insulation performance that is equal to or in excess of such presently used materials as EPS.

SUMMARY OF INVENTION

It is an object of the present invention to provide an insulated liner for cargo shipping containers having thermal insulation performance exceeding that obtained by EPS insulating containers. In this regard, the multiple baffles defining the container walls provide individual air chambers, each having a metallized surface to address the three modes of heat transfer: conduction, convection, and radiation in a manner that minimizes such transfer. As a result, testing under the ASTM C-518 standards has shown an 18% performance improvement by the baffled construction of the present invention over that provided by the same wall thickness of EPS.

A further object of the present invention is to reduce costs previously associated with the use of EPS. One such cost reduction is achieved as a result of the greater thermal efficiency previously discussed. The enhanced thermal insulation characteristic obtained under the present baffled liner enables extended shipping times without compromising the quality of the thermally-sensitive cargo.

Additional savings is obtained through reduced storage and transport costs. When stored, the present baffled container is in a collapsed, un-inflated state that occupies only $\frac{1}{20}^{th}$ the space required by the alternative, molded EPS containers. Not only does this volume reduction result in saved warehouse space, the transport of the in-inflated liner to the shipping site is considerably more efficient as a result of its reduced, per unit shipping volume.

A still further object of the present invention is to provide a baffled container liner that is virtually leak-proof in terms of container integrity. Constructed from multiple layers into a flat, easily stored envelope, when used, the envelope inflates into a closed-end container preventing liquid leakage from within. During transit, such liquid might originate from the cargo itself, or from the refrigerant, which is frequently ice. Such liquid is unwelcome to cargo air carriers, as it has the potential to be damaging to the airplane structure and cleanup can be quite expensive and time-consuming to accomplish.

A further object of the invention is obtained through its baffled construction. Upon inflation, the baffled layers of the flat envelope become substantially rigid, thus creating the container walls. These inflated walls, in addition to forming the container structure, also provide a degree of protective cushioning for sensitive perishables carried within.

The disposal problems associated with EPS are well known. In addition to creating a large volume of refuse, it is slow to breakdown, persisting as a landfill problem over many years. A further object obtained by the present invention is a reduction in the disposal profile for insulating liners. In addition to physically occupying less space, the polyolefin films used deteriorate much more rapidly in landfills than does EPS.

A still further object of the present invention is to provide a surface upon which to place customized graphics, using multiple colors. The polyolefin films utilized in the present invention provide a surface that is substantially equivalent to the plastic carriers used to create modern billboard displays. The present invention enables use of such films having pre-applied graphical images to form the outer surface of the insulating container liner. The film bearing the image(s) is precisely positioned during construction of the liner to enable creation of the inflated container having the desired graphical images.

Some further objects and advantages of the present invention shall become apparent from the ensuing description and as illustrated in the accompanying drawings.

BRIEF DESCRIPTION OF DRAWINGS

FIG. 1C is a perspective view of an inflated liner, differing from the view of FIG. 1B by the introduction of a fluid into the sealed envelope structure, in accordance with the present invention;

FIG. 1D is an enlarged perspective view taken of the encircled area of FIG. 1C, with portions in phantom, showing a weep port in an inflated liner in accordance with the present invention;

FIG. 2 is a planar view of a multiple-layer inflatable construction partway through the fabrication process, after attachment segments have been formed by heat-sealing in accordance with the present invention;

FIG. 3 is a partial plan view showing a single layer of a polyolefin film having a metallized strip pattern formed thereon in accordance with the present invention;

FIG. 4A is a partial enlarged perspective view showing individual film layers and the sealing tool as positioned prior to forming heat sealed attachment segments in accordance with the present invention;

FIG. 4B is a partial enlarged side elevation view showing compression of the multiple layers of FIG. 4A at optimal locations along the multi-layered surface in accordance with the present invention;

FIG. 4C is an enlarged partial perspective view of the multiple layers of FIGS. 4A and 4B shown after the selective attachment of certain of the layers to one another by heat sealing in accordance with the present invention;

FIG. 6 is a plan view of a feed roller showing various control mechanisms thereon in accordance with the present invention;

FIG. 7 is a schematic illustration of a mechanism for maintaining constant tension of the film stock in accordance with the present invention;

DETAILED DESCRIPTION

Figure 1:
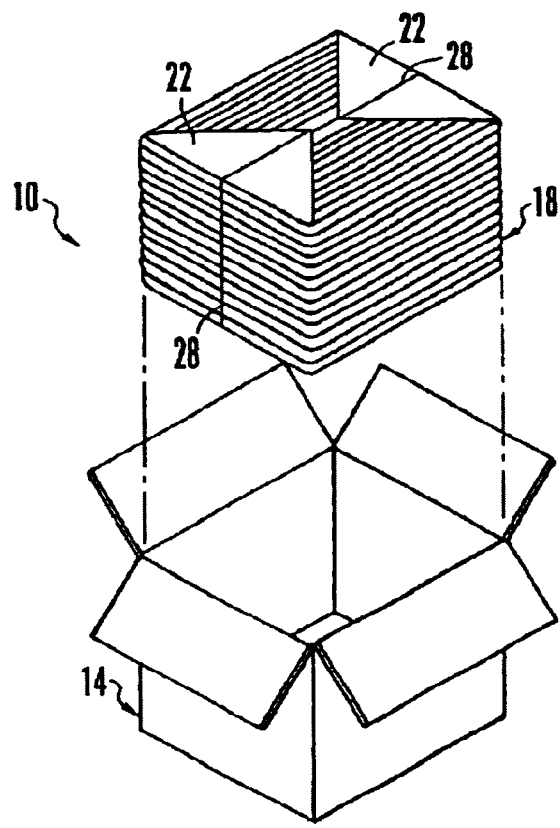
FIG. 1 is an exploded perspective view showing an insulated shipping liner as received within an outer shipping container in accordance with the present invention.

Reference is now made to the drawings, wherein like numerals refer to like parts throughout. An insulated shipment system 10 is shown in FIG. 1 having an outer shipping container 14, such as the type manufactured from corrugated cardboard, that receives an protects an inner insulated shipping liner 18. A pair of uninflated flaps 22 are shown folded over the insulated shipping liner 18, and when a sealed closure is desired, an adhesive, a zip-closure, or outer tape can each appropriately be used (none shown in the Figures).

Figure 1A:
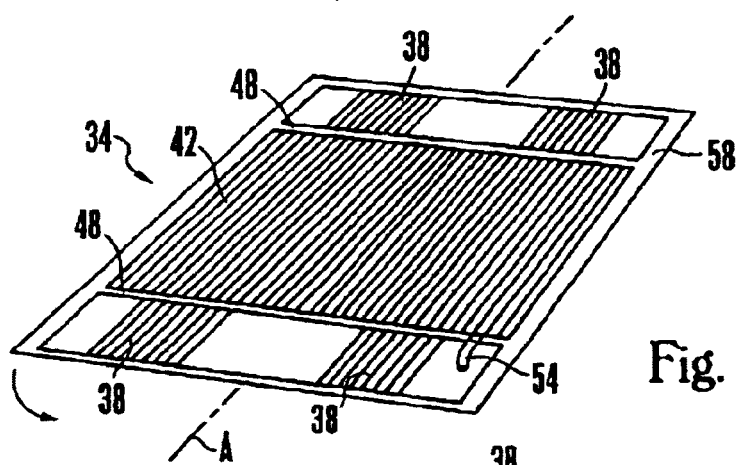
FIG. 1A is a perspective view of a partially-completed inflatable liner with multiple layers attached to one another along specific heat sealed lines of attachment, with a fold axis shown in phantom, in accordance with the present invention.

An outer seam 28 is clearly shown extending about a centrally-located outer periphery of the insulated shipping liner 18, and it is indicative of the presently preferred manner of construction for the shipping liner 18. In FIG. 1A a multi-sheet liner 34 is laid flat just prior to being folded along Fold Line A into the construction shown in FIG. 1B.

Returning again to FIG. 1A, attachment of the various layers of the multi-sheet liner 34 has occurred, creating individual sections having different functions in the finished inflatable liner. Two pairs of end panels 38 are provided, one pair to each lateral side of the multi-sheet liner 34. A central panel 42 is centrally located on the multi-sheet panel 34 and extends along substantially the entire length thereof. A pair of side corner strips 48 each border the central panel 42, forming a non-inflatable section lying between the central panel 42 and each of the end panels 38.

An inflation valve 54 extends from the central panel 42 through a section of the side corner strip 48. This valve is preferably of the known flat plastic layer type that permits entry of a pressure fluid through an inserted rigid tube, but collapses to seal the pressure fluid in when the rigid tube is withdrawn.

Figure 1B:
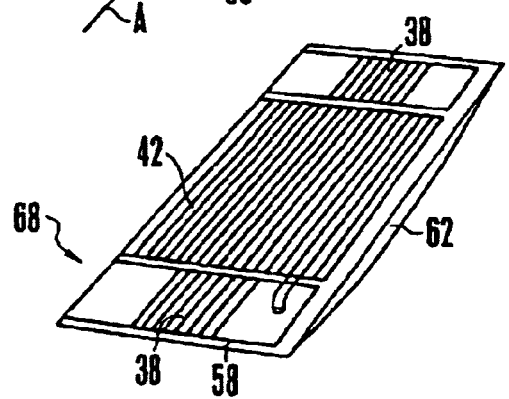
FIG. 1B is a perspective view of a completed inflatable liner, differing from the view of FIG. 1A by completion of the fold and application of a second heat seal along linear portions of the folded structure, in accordance with the present invention.

A peripheral strip 58 extends about the periphery of the multi-sheet liner 34, and is also a non-inflatable area. Turning now to FIG. 1B, upon folding the multi-sheet liner 34 about Fold Line A (shown in FIG. 1A), the peripheral strips 58 of the two halves are brought into contact with one-another. Upon their attachment along both lateral sides of the multi-sheet liner 34, the outer seam 28 is formed (see FIG. 1C), as is a container opening 62 into the inflatable envelope 68 that has been thereby created.

Turning now to FIG. 1C, a pressure fluid has been introduced into the inflatable envelope 68, resulting in an erect structure, the insulated shipping liner 18. As so converted, the double pair end panels 38 become a single opposed pair of container ends 74, and the central panel 42 becomes a plurality of lateral panels 78, in this case the two side panels, the two top panels, and a bottom of the shipping liner 18.

As is shown in greater detail in FIG. 1D, along the outer seam 28 is preferably formed a weepage opening 82. Functioning in much the same manner as the inflation valve 54, the weepage opening 82 serves as a pressure valve, opening to release any pressurization as may build within the insulated shipping liner 18 as a result of changes in "experienced" atmospheric pressure, melting ice or sublimating dry ice. Once such pressurization is released, the opposing side of the weepage opening 82 then come together, limiting any lingering adverse thermal losses.

Turning briefly to FIG. 2, the end panels 38 are separated by a plurality of uninflatable panels 88. Upon inflation of the shipping liner 18, these uninflated areas form four pair of gussets 92, two pair associated with and adjoining each of the container ends 74. These gussets 92 not only maintain a fluid seal within the shipping liner 18, they also "absorb" the extra material that is inherently provided when converting a planar structure into the 6-faced polyhedron shape of the shipping liner 18 (see FIG. 1C).

The individual layers in a presently preferred embodiment of the multi-sheet liner 34 are shown in FIG. 4A. These various layers are shown lying between a heated tool 98 and an impact surface 102. Layers "A" and "F" form the outer layer of the multi-sheet liner 34 (not shown in FIG. 4A), and preferably comprise a heat-sealable 3.0–3.5 mil polyolefin. The remaining layers "B" through "E" are also fabricated out of this same polyolefin; however, each are preferably 1.0 to 1.5 mil thick having a maximum Dyne level of 35. A plurality of metal stripes 108 forming an array is provided across one or both sides of the film surface, each with an optical density of 1.6 (minimum).

A presently preferred metal is aluminum, and strip placement is critical to the formation of the reflectorized baffles. As is shown by FIG. 3, in each instance, a length "X" of between 0.5"–1.5" (wide) strip of metal is followed by a length "Y" of a clear strip of between 0.15"–0.4" (wide) exposed polyolefin surface, with the width of this repeating pattern "Z" of between 0.65"–1.9". An exemplary value for the overall width of the roll "L" is 70".

While this pattern is followed for each striped metal pattern, each pattern is laterally shifted relative to adjacent layers. Thus, for "Typical "A" Position" if FIG. 4A, the outer layer "A" overlies a clear strip on both surfaces of layer "B", a metallized strip on one side of layer "C" and a clear strip on the other, a clear strip on the top side of layer "D" and a metallized strip on the bottom, a clear strip on both top and bottom of layer "E", and a clear strip on top of the final layer "F".

"Typical"B" Position" in FIG. 4A lies one-half cycle removed from "Typical "A" Position", and the vertical match up is entirely different. The bottom surface of layer "A" faces a metal strip on the upper surface of layer "B" and a clear strip on the bottom surface, a clear upper surface on layer "C" and a metal strip on the bottom surface, a clear strip on both the upper and lower surfaces of layer "D", a clear upper surface on layer "E" and a metal strip on the bottom, and a clear upper surface on the final layer "F".

As mentioned earlier, such alternation of clear and metal surfaces is required to form the various baffles in the multi-layer inflatable. Upon pressing down on the layers as shown arranged in FIG. 4A with the heated tool 98, provided the appropriate temperature is maintained, only adjacent clear strips will adhere to one another, and the metal strips function as release surfaces relative to an adjacent clear surface. Such vertical compression is shown in FIG. 4B, which in turn results in creating an array of alternating seams of attachment joining adjacent outer and intermediate layers. These seams of attachment form, in effect, an interconnected web. Upon inflation, this web expands to form a multi-layer baffle construction having a plurality of individual baffle chambers, which is shown in FIG. 4C.

Following the above "rules of adhesion," it is observed that for "Typical "A" Position" the clear lower surface of layer "A" adheres to the clear upper surface of layer "B" but not to the metal strip 108 on the upper surface of layer "C". The clear strips on bottom layer "C" and top layer "D" adhere to one another, but not the metal strip 108 on the bottom of layer "D" to the clear strip on the top of layer "E". The opposing clear strips on the bottom of layer "E" and the top of layer "F" adhere to one another, completing the vertical extent of "Typical "A" Position". With each diagonal side considered to be a "baffle", there are four baffles extending from layer "A" to layer "F" along "Typical "A" Position".

"Typical "B" Position" forms the alternative structure, with the bottom surface of layer "A" not adhering to the top metal strip 108 of layer "B", and the clear bottom of layer "B" adhering to the clear top surface of layer "C". The bottom metal strip 108 of layer "C" does not adhere to the clear upper surface of layer "D", while the clear lower surface adheres to the clear upper surface of layer "E". Finally, the bottom metal strip 108 of layer "E" does not adhere to the upper clear surface of final layer "F". It can be appreciated that such alternating layers can continue where a larger number of baffles is desired.

Figure 5A:
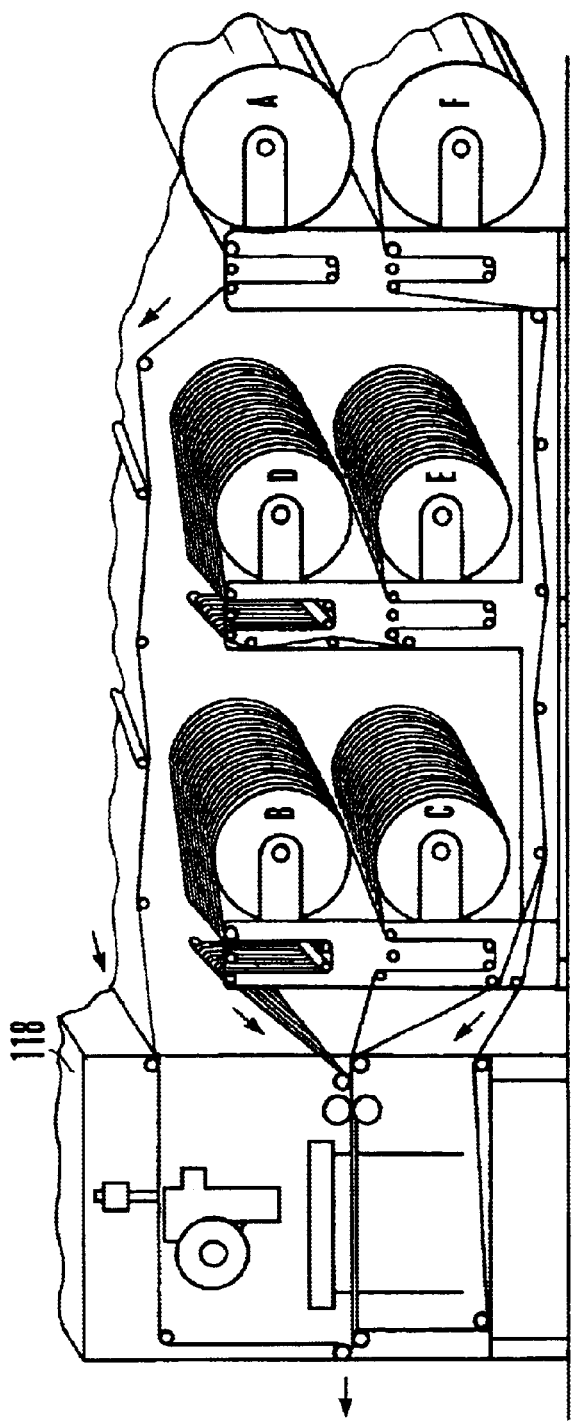
FIG. 5A is a schematic illustration of a manufacturing process for positioning the inner material layers shown in FIGS. 4A–C in accordance with the present invention.
Figure 5B:
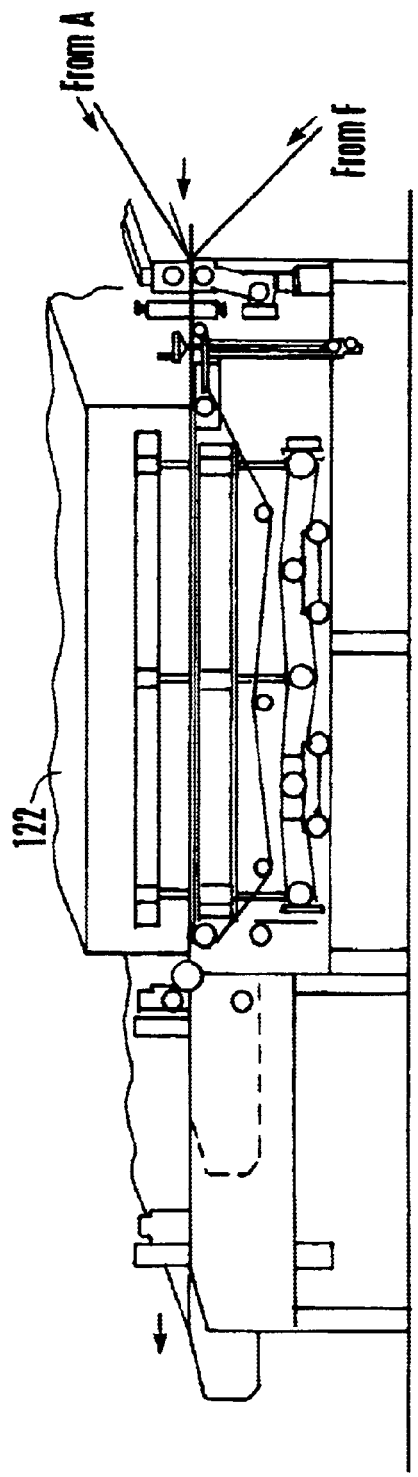
FIG. 5B is a schematic illustration of a manufacturing process for providing an outer, sealed envelope to surround the inner material layers of FIG. 5A in accordance with the present invention.

Turning now to FIG. 5A, a presently preferred mechanism for positioning the various layers and obtaining the carefully arranged multi-sheet liner 34 of FIG. 1A is depicted. The various supply rolls are labeled by the same designation as the layer letters of FIGS. 4A–C, with the films of layers B–E die cut to a size that is slightly smaller than the perimeter heat seal of the multi-sheet liner 34. Such dimensioning permits the outer peripheral edges of layers A and F to seal directly together, which in fact fabricates the inflatable envelope, and permits it to retain the inflating fluid. FIG. 5B depicts the heat seal section that joins the individual layers together as well as the outer edges of the outer layers, completing the insulated shipping liner.

The key to maintaining precise alignment of the three to five striped metallized films preferably requires monitoring both a metal stripe edge and a film edge for each supply roll for each film. For example, a feed roll 132 is shown in FIG. 6 received upon a roll support frame 136. A pair of support axles 138, one on each side, permits rotational movement of the feed roll 132.

When full, a typical feed roll 132 is 70 inches in width, 24 inches in diameter, and weighs nearly 1,200 pounds. Given the yield strengths of the polyolefin films that are to be typically employed, passive rotational movement of the feed roll 132 based upon forces applied to the film is not feasible. A drive motor 142 is used to provide the force required to rotate the feed roll 132, with a gear box 144 to enhance the motor efficiency shown in the example embodiment shown in FIG. 6.

A presently preferred drive motor would be one similar to Model No. C4D17FK5, a silicon controlled rectifier (SCR) type speed-controlled motor that is manufactured by Leeson Electric Corporation of Grafton, Wis. A suitable gear box for this application would be one similar to Model No.186 manufactured by Hub City of Aberdeen, S. Dak. Lateral positioning of the feed roll 132 is also crucial to the practice of the present invention, and a ram actuator 148 is attached to a fixed support (not shown) and the roll support frame 136 to enable the controlled lateral movement of the feed roll 132. An example of such an actuator would be Model No. 80374, made by Fife Corporation of Oklahoma City, Okla.

Positioning of the feed roll 132 and of the metal stripes 108 is determined using a pair of sensors. A stripe edge sensor 152 is centrally located over the feed roll 132 and monitors the edge position of a particular one of the metal stripes 108. Changes in edge position result in changes made to the tension applied to the film being unrolled from the feed roll 132.

A roll edge sensor 156 addresses lateral positional variance in the feed roll 132. Located along one edge of the feed roll 132, any changes in the edge location result in a corrective movement by the ram actuator 148 to physically move the roll support frame 136 relative to its support (not shown).

FIG. 7 illustrates the manner in which a uniform tension is maintained for a polyolefin film 162, as it is unrolled from the feed roll 132. A plurality of tension rollers 164 receive the polyolefin film 162 as it unwinds, the tension rollers 164 collectively functioning as a dancer assembly 168. By varying the weight of the lower tension rollers of the dancing assembly 168 a variance in the tension applied to polyolefin film 162 is obtained.

Additionally, the loops of the polyolefin film 162 running through the dancer assembly 168 serve to dampen variances in tension applied to the polyolefin film 162 as a result of either downstream process or variance in the unwind speed. If the loop becomes shortened because of a greater downstream use of the polyolefin film 162, a tension sensor 172 detects the shortened film length and signals the drive motor 142 of the feed roll 132 to increase its speed. Likewise, a lessening demand for the film results in a signal to slow or stop the drive motor 142.

Each unwind of striped metallized film includes the stripe edge, roll edge, and tension sensors 152, 156, 172. Their collective manner of operation will be briefly described. The stripe edge sensors 152 are arranged in such a way that their relative position to each other corresponds to the proper alignment of the finished honeycomb structure to the main heat seal die. For example, in FIG. 4A, the films "B" "E" are shown as properly positioned. During manufacturing these positioning sensors maintain this proper positioning by adjustments to each of the individual layers, "B" "E", moving a layer slightly to the left or right as required to accommodate normal position variations as the film unwinds. The roll edge sensors 156 measure edge location for each of the feed rolls of striped metallized film, and sense any variation in the lateral positions of their respective roll of film. As any one roll starts to drift one way or the other the particular roll edge sensor will send a signal to the appropriate ram actuator 148 to move that feed roll back until the film is once again is properly aligned.

The electronic sensor will maintain the center point of the roll correctly, however, if there is any variation in the width of the stripe or the entire width of the film roll, the tension must be adjusted to correct any variation. If the width of the stripes is too great tension will be added to shrink it to the proper alignment. Conversely, if the width of stripes is too narrow tension will be reduced to increase the width. The stripe edge and roll edge sensors 152, 156 act in reference to one-another to correct width variation using tension in addition to moving the entire roll toward the left or the right to correct for any stripe drift.

EXAMPLES

Figure 8:
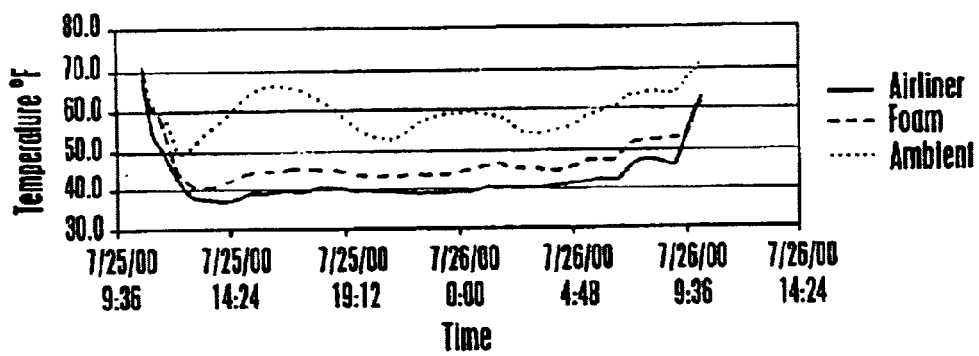
FIGS. 8–18 are graphs comparing temperature changes over time experience by cargo insulated using a liner employing the present invention and competitive technologies.

Save-On Seafood Location: St. Petersburg, Fla. Product Shipped: Fresh Salmon, Tuna, and Swordfish FilletsFoam Type: 1.5"Foam InsertsShipping Mode: UPS Next Day AirRefrigerant: One 2 lb Gel Pack, sprinkling of dry iceConsignee(s): Various Outback SteakhousesAs shown in FIG. 8 all shipments arrived at their destinations in good condition both foam and AirLiner®. All AirLiner® liners were fully inflated. It should be noted that all valves were heat-sealed shut after inflation. Going into the test we had highlighted this as a potential concern so we eliminated the possibility of valve failures by heat-sealing them closed. This insured we were testing the performance of the Air-Liner®.

One interesting point that was noted is that although the AirLiner® and foam were packed the identical way, the AirLiner® went to a lower start temperature than the foam, 37° F. vs. 41° F. The AirLiner® and foam tracked each other with the AirLiner® on average being 5° cooler. The extremes in the data were Iowa, with the AirLiner® being 15° cooler than foam and both Minnesota locations with Foam being slightly better than AirLiner®.

The product was well received by all locations and the general comment was that product in AirLiner® seemed colder. There was a general consensus that the AirLiner® was much easier to dispose of than the foam. Some concern was voiced over the difficulty in opening the AirLiner®. For the beta test we used two-sided PS tape that was extremely aggressive.

Figure 15:
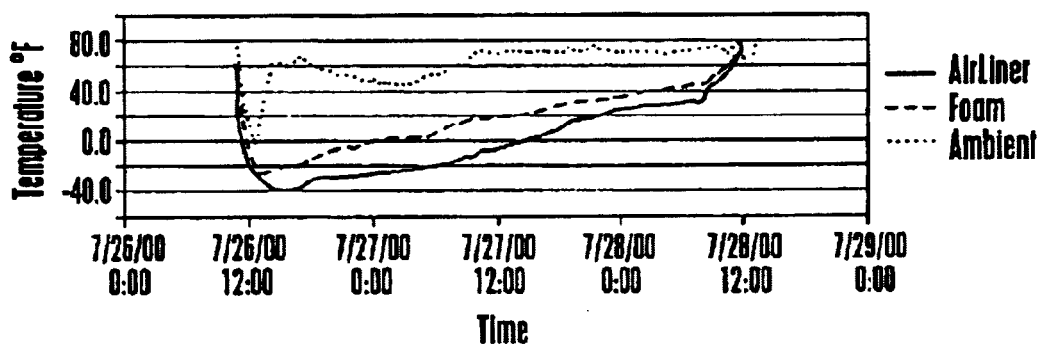
Figure 16:
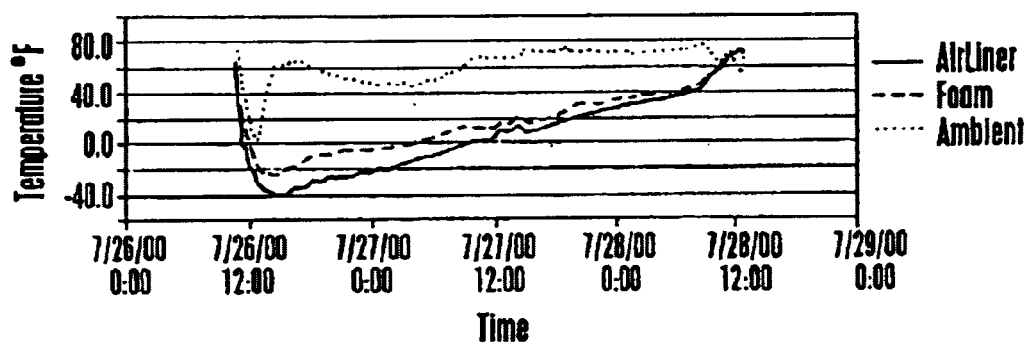
Figure 17:
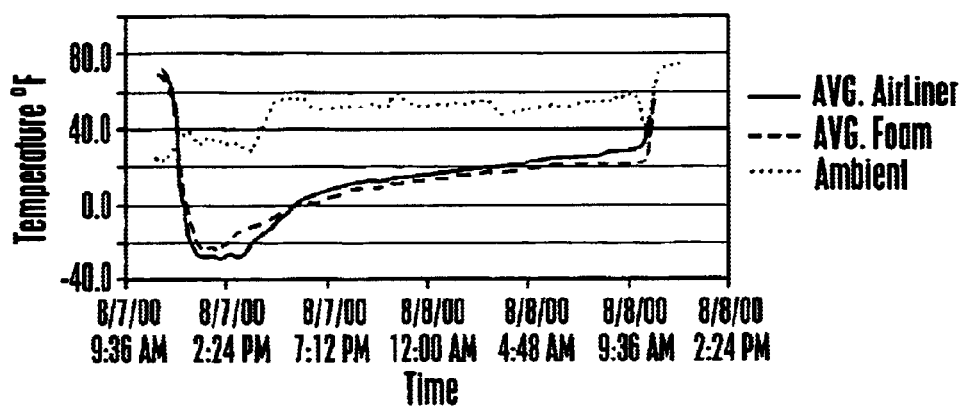

Service Foods Location: Atlanta, Ga. Product Shipped: Frozen steaks, hamburger, and chicken breasts Foam Type: 1.25"molded foam boxesShipping Mode: UPS 2nd Day AirRefrigerant: 8 lbs dry iceConsignee(s): Various nationwideAs shown in FIGS. 15 and 16, during this shipment we experienced three suspect shipments out of ten because of the external probe coming through the seal of the AirLiner®. In each of these cases, Vitafort, Rich United, and the Omega Group, it was reported that there was a gap in the seal around the AirLiner® allowing heat in. In the case of the Omega group the product was still good but this product was received next day air instead of second like the remainder of the shipments.

In all shipments the phenomena of the AirLiner® achieving a lower initial temperature was seen. On average the AirLiner® was 19° F. cooler than the foam at the beginning of the test. At the end of the test the difference was 10° excluding the probe failures, and 4° if they are included.

The comments from the consignees were very positive ranging from "neat package, absolutely flawless temperature solution" to "impressive package".

The most dramatic showing of AirLiner® was the shipment to San Diego where there was a 30° difference in the temperatures and the AirLiner® shipment was completely frozen while the foam shipment was thawed. The worse case excluding the probe failures was Imperial where the temperatures tracked almost identically throughout the shipment. Overall, four shipments with AirLiner® were equal to foam, three were superior (>5° F.), and two had equipment failures (probes).

Ocean Beauty Location: Seattle, Wash. Product Shipped: Frozen minced salmon Foam Type: ⅞"molded foam boxes-Shipping Mode: UPS 2nd Day AirRefrigerant: 2 lbs dry iceConsignee(s): Gandy Dancer Mich., Charley's Crab SC, Hillcrest CC. Okla.

Figure 9:
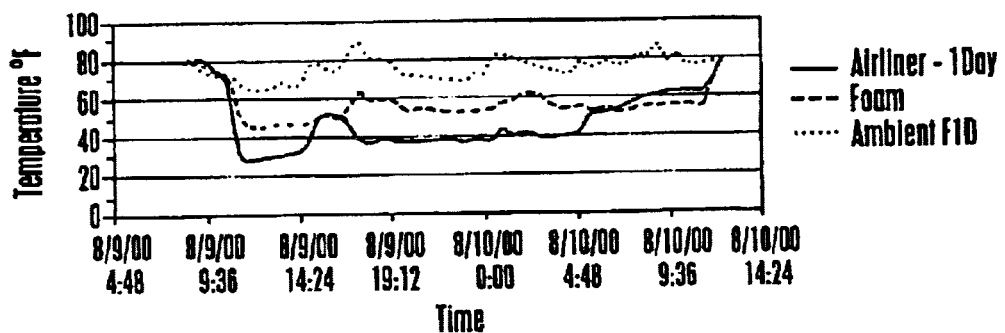
Figure 10:
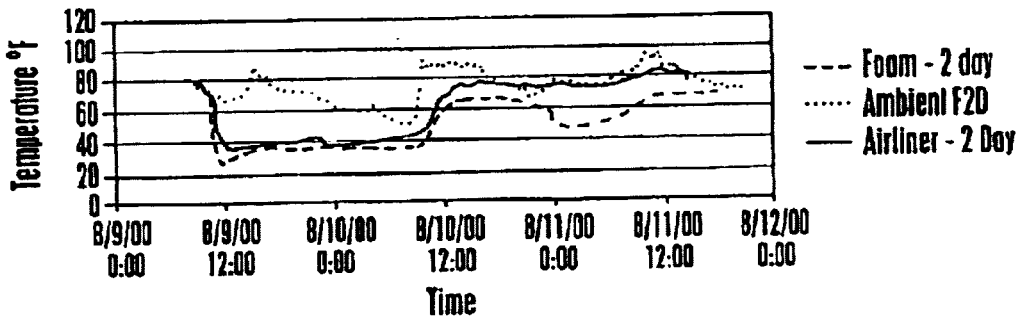
Figure 13:
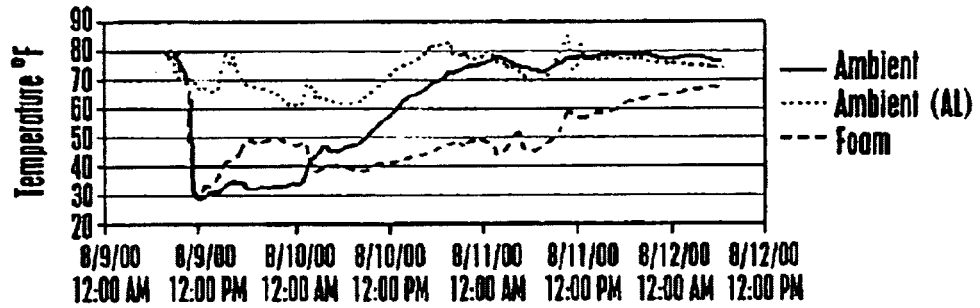

Port Chatham Location: Seattle, Wash. Product Shipped: Frozen salmon products Foam Type: ⅞"molded foam boxes-Shipping Mode: UPS 2nd Day Air, 3$^{rd}$ dayRefrigerant: 2 lbs gel packs Foam boxes onlyConsignee(s): Cargo Tech, Port Chatham Pa. As shown in FIGS. 9, 10, and 13, this test ended up being somewhat inconclusive since no refrigerant was placed in the AirLiner® boxes. The AirLiner® shipment maintained the temperature for approximately 20 hours before seeing a rise in temperature begin.

Port Chatham still viewed these results as positive and was not discouraged by the test results. Chris Ralph at Port Chatham was a recipient of one of the Del Monte shipments that arrived in excellent condition.

Figure 18:
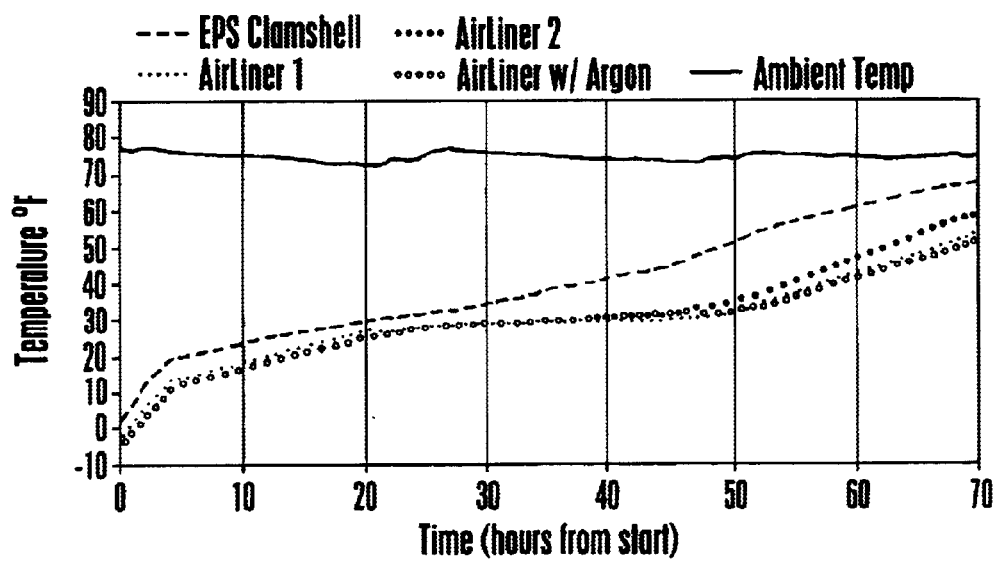

Bear Creek Corporation Location: Medford, Oreg. Product Shipped: Frozen Turkeys Foam Type: ⅞"molded foam boxesShipping Mode: Static Lab TestsRefrigerant: NoneConsignee(s): None The results of FIG. 18 depict a test that was performed by Bear Creek. It was a static lab test using no refrigerant and 7.3 lb frozen turkeys. This was also the first use of Argon in a test. As far as the results they were extremely positive with regard to the AirLiner® vs. EPS study. The turkey in the EPS began to thaw after 25 hours while the AirLiner® product did not begin to thaw until 48 hours a 92% improvement.

The surprise was the lack of improvement in the insulation performance with the use of Argon. Based upon Berkeley's work, we had expected approximately a 40% improvement with Argon and achieved none.

The good news is that based upon their lab tests they have begun a series of 20 test shipments around the country using the AirLiner®. They are shipping a 4.5# smoked ham with no refrigerant. They currently do not use refrigerant when shipping this product with EPS. As of the date of this report, they have received feedback from three shipments all of it was positive.

Del Monte Location: Honolulu, Hi. Product Shipped: Fresh Pineapple Foam Type: 2"EPS Inserts, wrapped in COOLGUARD® Shipping Mode: UPS 2$^{nd}$ Day AirRefrigerant: Gel Pack, 1 lb of dry iceConsignee(s): Del Monte Chicago, Miami, and LA; Port ChathamIn both of the shipments, to Miami and to Port Chatham, the product was reported to be significantly cooler in the AirLiner® while the Chicago and LA shipment report no difference. Unfortunately, the AirLiner® recorder failed for the Miami shipment so we have no hard data.

Figure 11:
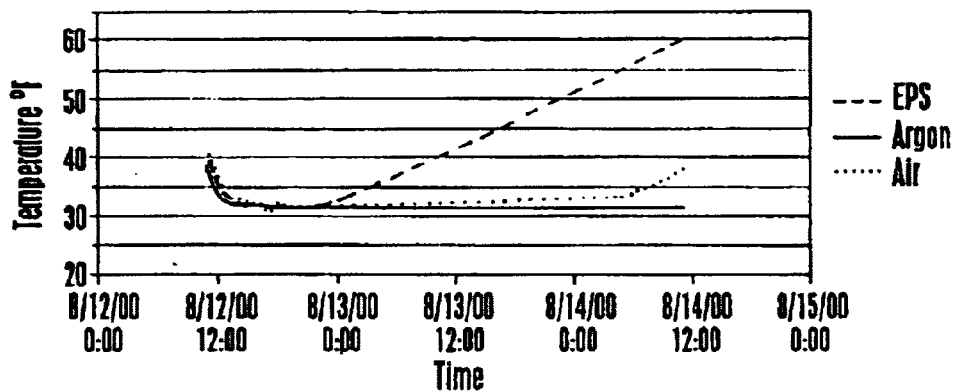

This is the first shipment we had using Argon as an inflation gas. Del Monte chose this gas based upon their internal lab results that showed Argon as a clear advantage. The graph shown in FIG. 11 shows their results. They did not record any day two temperatures so it is suspected that the foam did not actually shoot up in a straight line as shown in FIG. 11, but had more of a curve.

Figure 12:
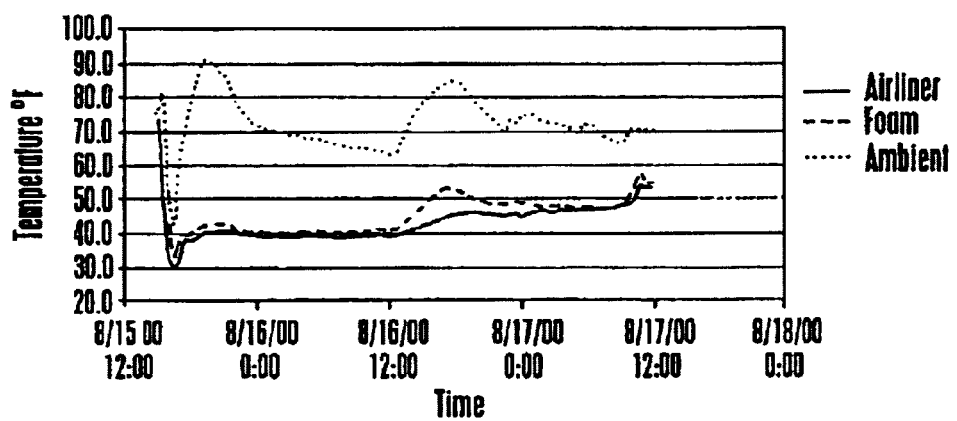

The actual shipments from Del Monte are shown in FIG. 12. Although there is no apparent difference between the two, it must be recalled that this was 2"thick EPS wrapped in a COOLGUARD® insulation product as well.

Figure 14:
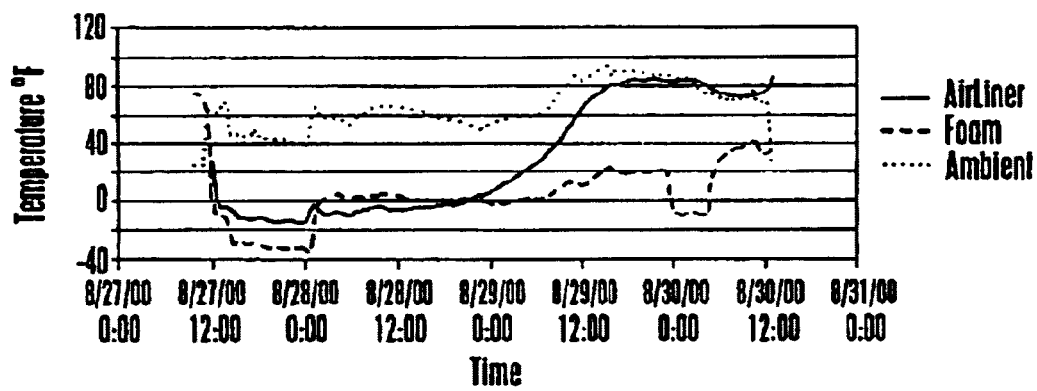

Omaha Steaks Location: Omaha, Nebr. Product Shipped: Frozen Meat FatFoam Type: 1.5"Molded Foam BoxShipping Mode: Fed Ex 3$^{rd}$ DayRefrigerant: 10 lbs Dry IceConsignee(s): David McKinney This was a shipment of just one AirLiner® and one foam box. As shown in FIG. 14, it was also the most dramatic difference showing the foam to be better. When these products were packed the 10 lbs of dry ice was place on the bottom of the package with the meat on top of it. The dry ice was 10×8×3. In the graph above it can be seen that the AirLiner° product lasted about 1-½ days before seeing a dramatic increase in temperature. It is believed that this is how long the dry ice lasted in AirLiner®, while the dry ice had just disappeared in the foam product when it was opened.

I believe the key to this failure is how the product was packed with the dry ice on the bottom. When AirLiner® sees the extremely low temperature of the dry ice by direct contact the psig goes to basically zero i.e. the bag is deflated. When the bag deflated, the dry ice is basically resting on the bottom of the bag with virtually no insulation so it goes to a gaseous state much quicker.

DISCUSSION

Figure 19:
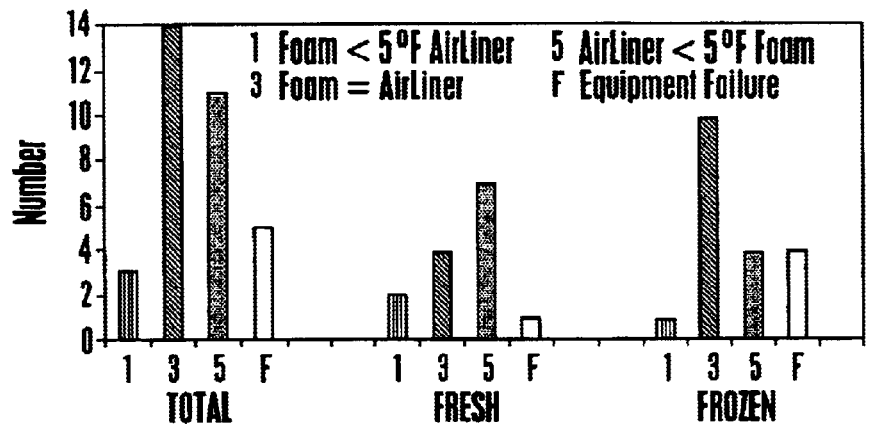
FIG. 19 is a bar graph summarizing observed comparative results for different types of temperature sensitive cargo.

In order to assess the trial results I ranked all of the individual shipments 15. The definition of the scale is as follows: 1 Foam<5° F. AirLiner® 3Foam=AirLiner® 5 AirLiner® <5° F. FoamFEquipment FailureAs is referenced in FIG. 19, 76% of the shipments were equal or better than the foam; 33% were significantly better. 50% of the fresh shipments were significantly better while only 21% of the frozen shipments were significantly better.

These percentages highlight our need to better understand the effect of the packing methods, specifically when dry ice is used (see above discussion).

Based upon these results, the shipment of fresh products, as well as frozen products using gel packs or no refrigerant, can be made with confidence in obtaining equal or better results than with EPS. Further studies are required to understand and explain the lack of improvement observed when using Argon gas. Such results presently suggest that the mode of heat loss is convection. Further experiments are necessary to better assess this observed characteristic.

Our invention has been disclosed in terms of a preferred embodiment thereof, which provides an improved inflatable insulating panel, which can be used for, among other end uses, a liner for cargo containers, that is of great novelty and utility. Various changes, modifications, and alterations in the teachings of the present invention may be contemplated by those skilled in the art without departing from the intended spirit and scope thereof. It is intended that the present invention encompass such changes and modifications.

We claim:

1. A sheetform insulating bag comprising:

a plurality of material layers attached to one another along a substantial portion of an outer periphery of each of said material layers in a manner forming an inflatable envelope having an opening and a fluid containment region;

an inflation valve attached to said envelope and in selective fluid communication therewith; and a plurality of inner seams selectively attaching specific adjacent material layers to one another at predetermined locations throughout said plurality of material layers in a manner forming a plurality of individual baffle chambers within said plurality of material layers, wherein multiple ones of a plurality of surfaces of said plurality of material layers are metallized at selected locations, and each of said plurality of metallized layers comprise a metal stripe attached to and extending along one of said plurality of surfaces of said plurality of material layers.

2. An insulating bag according to claim 1, wherein each said metal stripe extends along and is attached to a surface of said plurality of material layers formed within a separate one of said plurality of baffle chambers.

3. An insulating bag according to claim 2, wherein a pair of said metal stripes extend along and are attached to a surface of said plurality of material layers formed within at least one of said plurality of baffle chambers.

4. An insulating bag according to claim 3, and further comprising an inflation valve attached to said envelope and in selective fluid communication with said plurality of individual baffle chambers.

5. An inflatable insulating panel comprising:

a pair of sheetform outer layers attached to one another about their respective outer peripheries in a manner defining an inflatable bag;

a plurality of intermediate sheetform layers received within said inflatable bag and laterally extending between said pair of sheetform outer layers;

an array of alternating seams of attachment joining adjacent sheetform outer and intermediate layers in a manner forming an interconnected web that upon inflation of said inflatable bag expands to form a plurality of individual baffle chambers;

an inflation valve attached to said inflatable bag and in selective fluid communication with said interconnected web; and a plurality of metal stripes individually received upon and attached to a plurality of surfaces of said intermediate sheetform layers.

6. An insulating panel according to claim 5, wherein said plurality of metal stripes comprise a metal stripe array in substantial parallel relation to said array of alternating seams of attachment.

7. An insulating panel according to claim 6, wherein said metal stripe array is in substantial registration with said interconnected web, such that upon the expansion thereof, at least one of said plurality of metal stripes is located within each of said plurality of individual baffle members.

* * * * *